United States Patent
Imasaki et al.

(10) Patent No.: US 7,272,490 B2
(45) Date of Patent: Sep. 18, 2007

(54) TRAIL ANALYSIS METHOD AND APPARATUS

(75) Inventors: Naoki Imasaki, Kamakura (JP); Takashi Koiso, Kawasaki (JP); Kanako Hattori, Yokohama (JP); Takufumi Yoshida, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 283 days.

(21) Appl. No.: 11/150,312

(22) Filed: Jun. 13, 2005

(65) Prior Publication Data

US 2006/0058944 A1    Mar. 16, 2006

(30) Foreign Application Priority Data

Sep. 14, 2004   (JP)   ............................. 2004-266949

(51) Int. Cl.
*G01C 21/00* (2006.01)

(52) U.S. Cl. ...................... 701/200; 701/207; 701/214; 701/300; 340/572.1; 340/825.49; 342/357.07; 342/357.08

(58) Field of Classification Search .................. 701/66, 701/200, 201, 207, 214, 300; 340/573.1, 340/572.1, 573.4, 825.49; 342/357.01, 357.07, 342/357.08

See application file for complete search history.

(56) References Cited

U.S. PATENT DOCUMENTS

| | | | |
|---|---|---|---|
| 6,437,696 B1 * | 8/2002 | Lemelson et al. | ....... 340/573.4 |
| 2003/0210148 A1 | 11/2003 | Imasaki | |

FOREIGN PATENT DOCUMENTS

| | | |
|---|---|---|
| JP | 2001-266010 | 9/2001 |
| JP | 2003-263641 | 9/2003 |

* cited by examiner

*Primary Examiner*—Gertrude A. Jeanglaude
(74) *Attorney, Agent, or Firm*—Finnegan, Henderson, Farabow, Garrett & Dunner, L.L.P.

(57) ABSTRACT

A trail analysis method of movable object includes acquiring first stay event data indicating a first location, a first arrival time of a first movable object to the first location and a first staying time, and second stay event data indicating a second location, a second arrival time of a second movable object to the second location and a second staying time, evaluating coincidence between the first and second locations based on the first and second stay event data, evaluating whether a first time zone specified by the first arrival time and the first staying time and a second time zone specified by the second arrival time and the second staying time overlap, from the first and second stay event data, and evaluating contact between the first and second movable objects using location and staying time evaluation results.

20 Claims, 15 Drawing Sheets

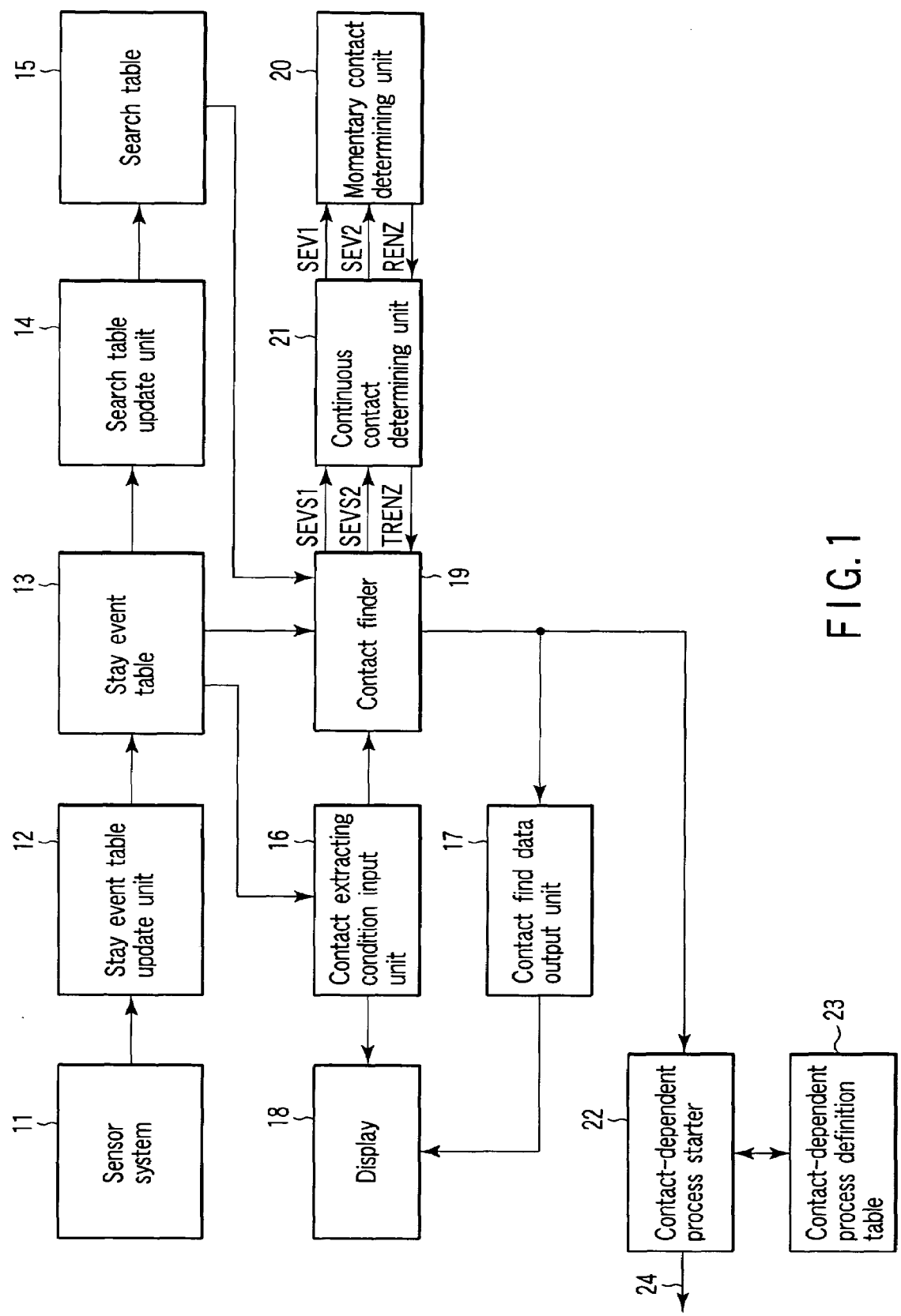
F I G. 1

| CL1-1 | CL1-2 | CL1-3 | CL1-4 | ...... | CL1-m |
|---|---|---|---|---|---|
| CL2-1 | CL2-2 | CL2-3 | CL2-4 | ...... | CL2-m |
| | ...... | | | | |
| CLp-1 | CLp-2 | CLp-3 | CLp-4 | ...... | CLp-m |

FIG. 7

| PID1 | tn1-1 | tx1-1 | pds1-1 | tn1-2 | tx1-2 | pds1-2 | ... |
|------|-------|-------|--------|-------|-------|--------|-----|
| PID2 | tn2-1 | tx2-1 | pds2-1 | ... | | | |
| ⋮ | ⋮ | ⋮ | ⋮ | ... | | | |
| PIDm | tnm-1 | txm-1 | pdsm-1 | ... | | | |

TRAIL ANALYSIS METHOD AND APPARATUS

CROSS-REFERENCE TO RELATED APPLICATIONS

This application is based upon and claims the benefit of priority from prior Japanese Patent Application No. 2004-266949, filed Sep. 14, 2004, the entire contents of which are incorporated herein by reference.

BACKGROUND OF THE INVENTION

The present invention relates to a trail analysis of a movable object such as a human or other, particularly to a method of analyzing a contact status between movable objects and a system therefore.

In related art, there has been developed a system for monitoring position of a walker moving in a facility such as a shopping center by installing a plurality of receivers in the facility and carrying the walker with a transmitter. Such a system allows providing information depended upon the attribute and current position of the walker to the walker.

Use of the above system allows extracting features common to a plurality of walkers or all walkers in the facility by acquiring and analyzing a moving history of a walker. Japanese Patent Laid-Open No. 2001-266010 discloses to apply such a system to a retail store to analyze migration condition of a customer in a shop and staying time thereof at a sales floor. The system can monitor movement of each walker but cannot monitor contact situation of the walker with the other person so that the walker talks with the other person. Accordingly, the system cannot perform analysis on service of an employee in a retail store and the like.

Japanese Patent Laid-Open No. 2003-263641 discloses an apparatus for analyzing behavior of a customer by means of an video camera arranged in a shop. This describes attendance-on-customer detection, but does not describe a concrete detection method. This method is thought to be poor in utility because detection is difficult due to position of a video camera, or the detection of the customer movement using the video camera is difficult in terms of privacy.

The present invention is directed to provide a trail analysis method capable of detecting effectively contact between moving objects without visual inspection and a system therefore.

BRIEF SUMMARY OF THE INVENTION

An aspect of the present invention provides a trail analysis method of movable object comprising: acquiring, via wireless communications, first stay event data indicating a first location where a first movable object exists, a first arrival time of the first movable object to the first location and a first staying time thereof, and second stay event data indicating a second location where a second movable object exists, a second arrival time of the second movable object to the second location and a second staying time thereof; acquiring location evaluation indicating whether the first location coincides with the second location based on the first stay event data and the second stay event data; acquiring time zone evaluation indicating whether a first time zone specified by the first arrival time and the first staying time and a second time zone specified by the second arrival time and the second staying time overlap, from the first stay event data and the second stay event data; and evaluating contact between the first movable object and the second movable object based on the location evaluation and the time zone evaluation to output evaluation data.

Another aspect of the present invention provides a trail analysis apparatus for a movable object comprising: a sensor unit configured to acquire first stay event data indicating a first location where a first movable object exists, a first arrival time of the first movable object to the first location and a first staying time, and second stay event data indicating a second location where a second movable object exists, a second arrival time of the second movable object to the second location and a second staying time; a location evaluator to evaluate whether the first location coincides with the second location based on the first stay event data and the second stay event data; a time zone evaluator to evaluate whether a first time zone specified by the first arrival time and the first staying time and a second time zone specified by the second arrival time and the second staying time overlap, from the first stay event data and the second stay event data; and a contact evaluator to evaluate contact between the first movable object and the second movable object using evaluation results of the location evaluator and the time zone evaluator.

BRIEF DESCRIPTION OF THE SEVERAL VIEWS OF THE DRAWING

FIG. 1 is a block diagram of a trail analysis system according to a first embodiment of the present invention;

FIG. 7 is a diagram showing an example of a structure according to a search table;

DETAILED DESCRIPTION OF THE INVENTION

Figure 2A:
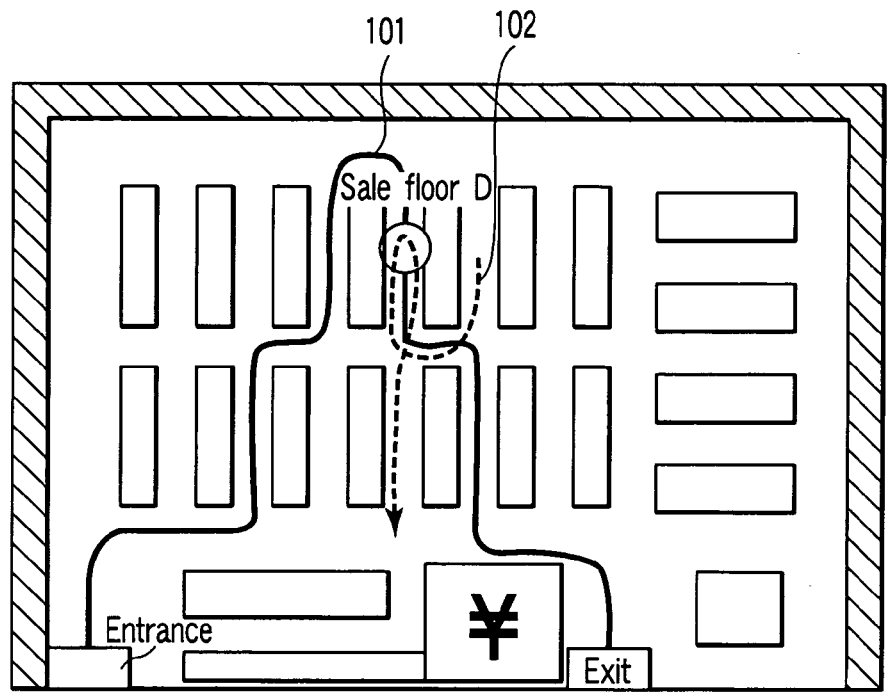
FIGS. 2A and 2B are diagrams of a concrete example of analyses by a trail analysis system.

There will now be described embodiments of the present invention in conjunction with accompanying drawings.

A trail analysis system of a movable object concerning one embodiment of the present invention is realized using a computer, for example. The system comprises a sensor system 11, a stay event table updating unit 12, a stay event table 13, a search table updating unit 14, a search table 15, a contact extracting condition input unit 16, a contact find data output unit 17, a display unit 18, a contact finder 19, a momentary contact determining unit 20 and a continuous contact determining unit 21 as shown in FIG. 1. Further, a contact dependent process starter 22 and a contact dependent process definitions table 23, if necessary.

A line analysis system concerning the present embodiment analyzes contact situation of a plurality of movable objects from information provided by a sensor system observing a trail of a movable object such as a walker moving in a certain observation area. For example, the trail analysis system of the present embodiment can be used for evaluation of customer service quality or service support in a retail store, for example.

Figure 2B:
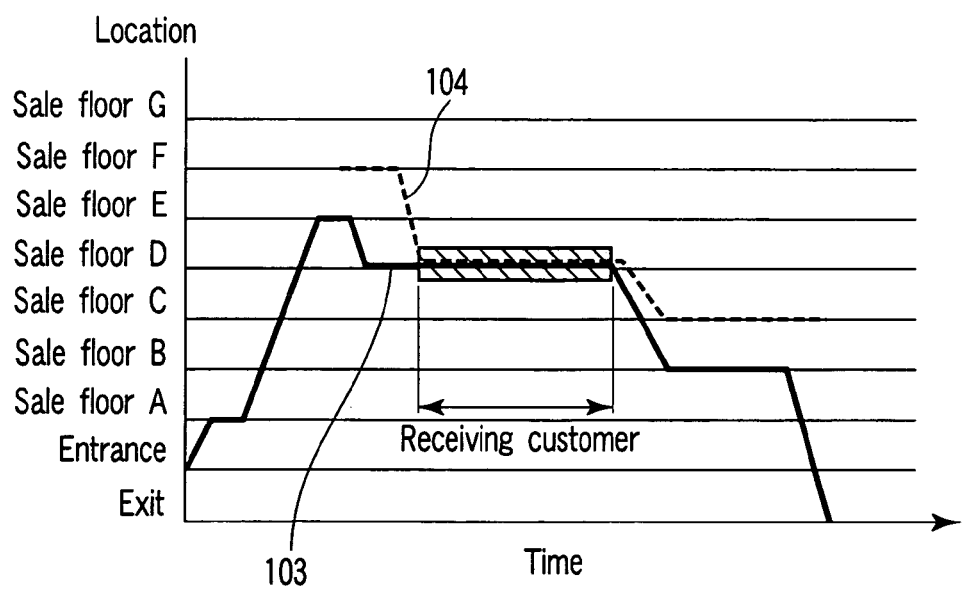

More concretely, a trail 101 of a customer and a trail 102 of a salespeople in, for example, a retail store are assumed to be shown as FIG. 2A, and tracks 103 and 104 on a time-space wherein a horizontal axis indicates a time and a vertical axis indicates a location are assumed to be shown as FIG. 2B. If the tracks 103 and 104 overlap, the overlapped region is determined to be on service. There will be explained each part of FIG. 1.

[Sensor System 11]

Figure 3:
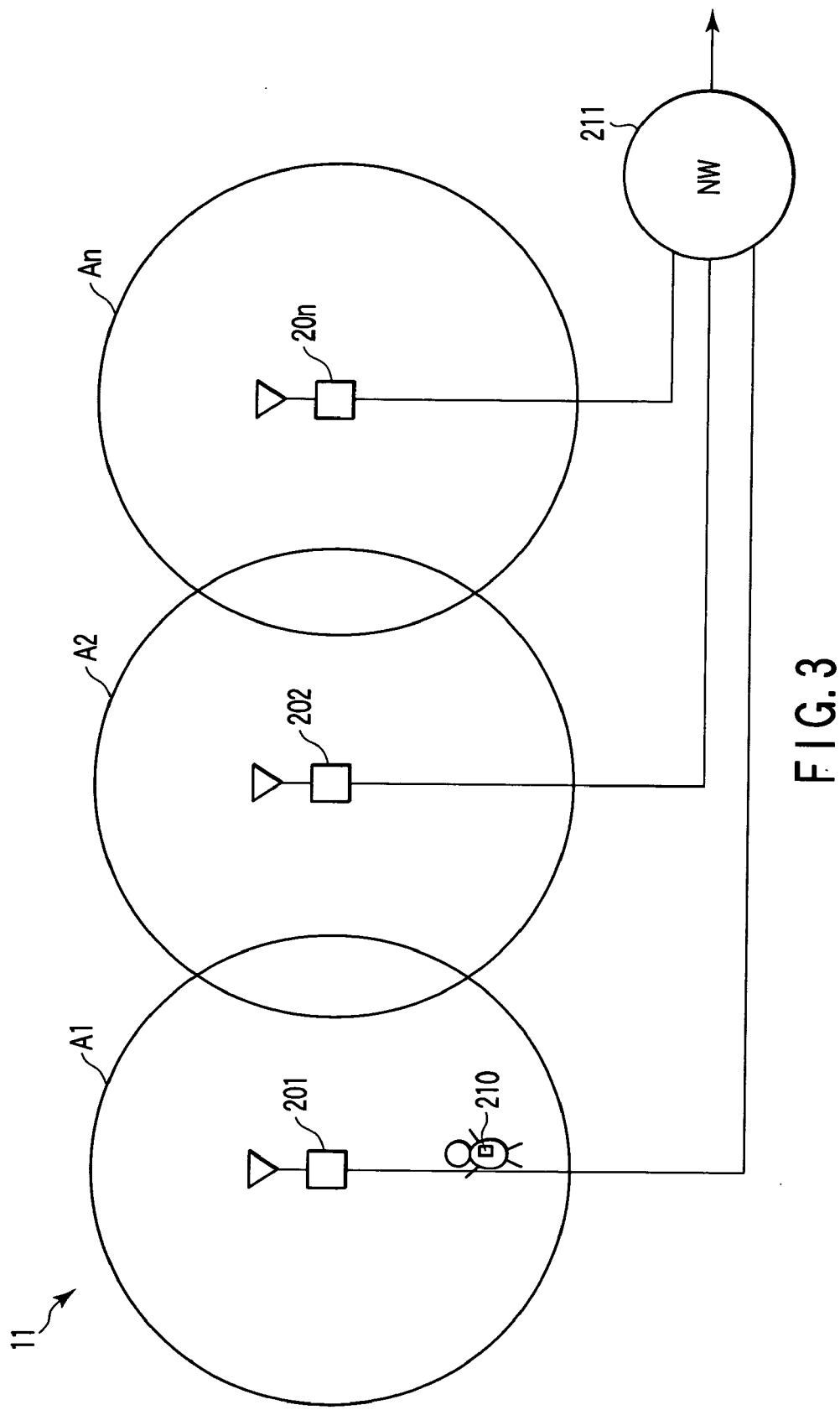
FIG. 3 is a diagram of an example of a sensor system.

A sensor system 11 uses a radio tag system as an example. The radio tag system comprises a plurality of receivers 201-20$n$ installed in an observation area and a transmitter 210 taken along by a customer (referred to as to a movable object), to which an ID (transmitter ID) peculiar to the object is given, as shown in FIG. 3. The receivers 201-20$n$ are connected to stay an event table updating unit 12 through a network 211. The receivers 201-20N have given detection areas A1-An, respectively.

When the transmitter 210 comes in a certain detection area Ai (i=1, 2, ..., N), the receiver 20$i$ (=1, 2, ..., N) having the detection area Ai sends an arrival event including a transmitter ID of the transmitter 210 and an arrival flag indicating that the transmitter 210 arrived at the detection area Ai, to the stay event table updating unit 12. When the transmitter 210 leaves the detection area Ai, the receiver 20$i$ sends a secession event including the transmitter ID of the transmitter 210 and a secession flag indicating that the transmitter 210 left the detection area Ai, to the stay event table updating unit 12.

[Stay Event Table 13]

Figure 4:
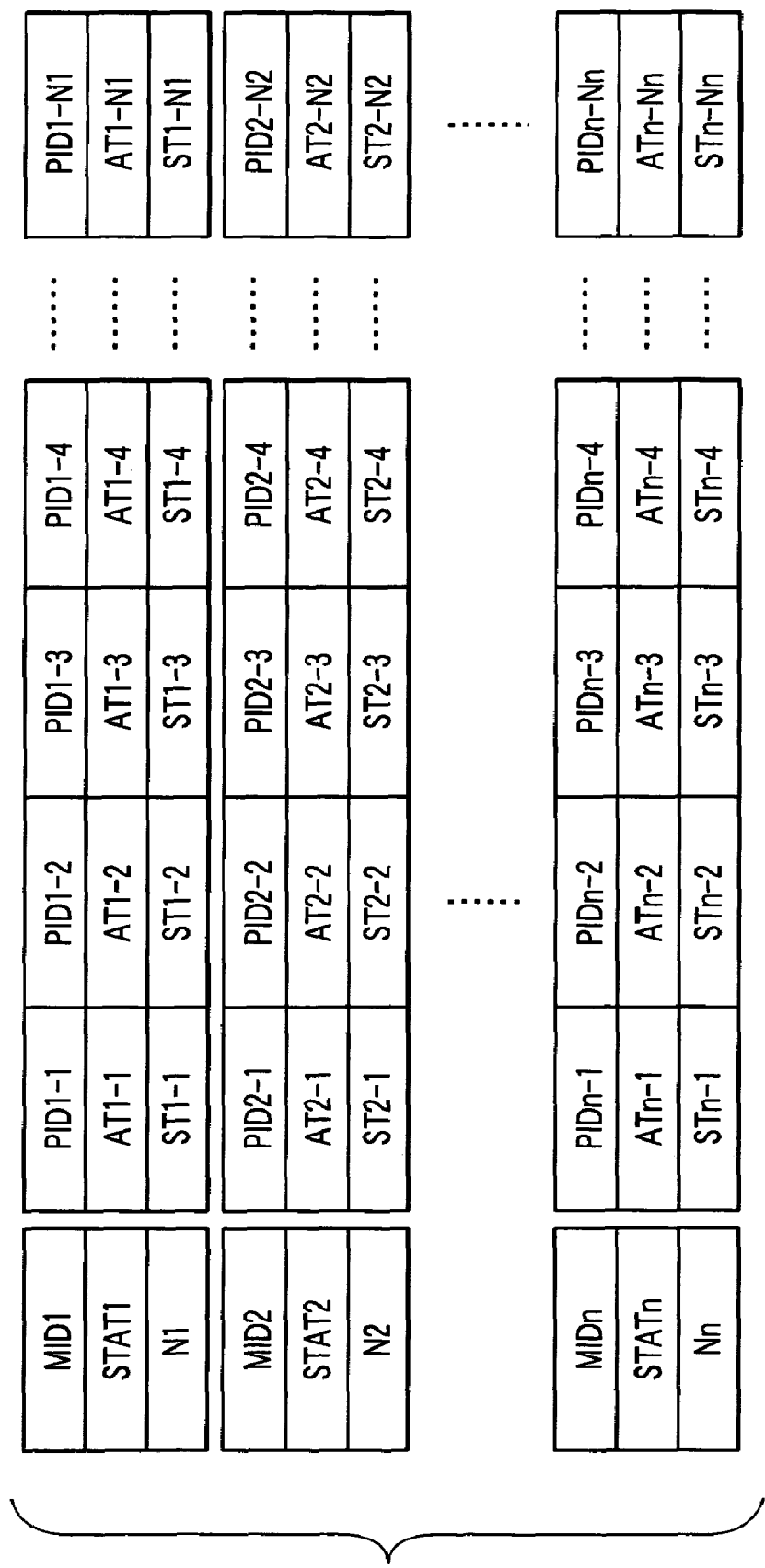
FIG. 4 is a diagram showing an example of a structure of a stay event table.

The stay event table 13 provides on a storage unit such as a memory or a hard disk, and has a structure as shown in FIG. 4, for example. In FIG. 4, MIDi indicates a peculiar ID given to the movable object (referred to as movable object ID), STAi indicates a status flag and Ni indicates the number of stay events. PIDi-j which is a stay location ID indicating a stay location of the movable object, ATi-j which is information of an arrival time of the movable object, and Sti-j which is information of staying time of the movable object are stored in association with them. However, i=1, 2, ..., n, j=1, 2, ..., Nn.

[Stay Event Table Updating Unit 12]

The stay event table updating unit 12 generates a stay event using the arrival event and the secession event receiving from the sensor system 11, and stores it in a given position of the stay event table 13. The stay event table updating unit 12 refers to a receiver ID-location ID association table (not shown) wherein each receiver ID is associated with a location ID representing an installation location of each receiver, and a transmitter ID-movable object ID association table (not shown) wherein each transmitter is associated with a movable object ID of the movable object taking along the transmitter, and uniquely converts the receiver ID and the transmitter ID to the location ID and the movable object ID, respectively. To the arrival event and secession event are attended a receiver ID specifying a destination receiver and information on a time at which the event was received.

An operation of the stay event table updating unit 12 will be described.

For simplicity, assuming that the arrival event and secession event on each transmitter ID always alternately arrive at the stay event table updating unit 12, although it is not essential constraints in the present embodiment.

Figure 5:
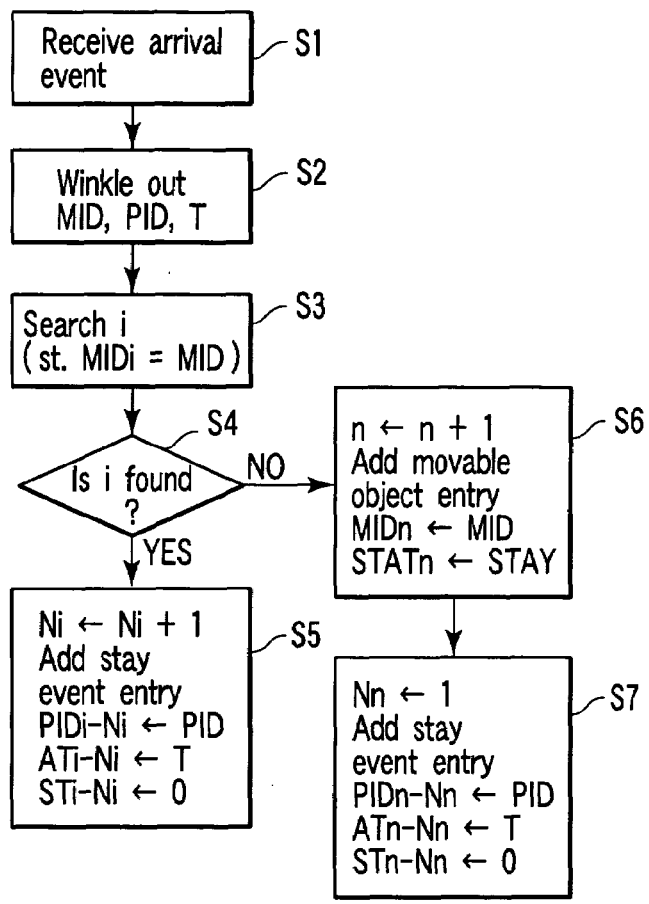
FIG. 5 shows flowchart to explain an operation in an arrival event receipt of a stay event table updating unit.

There will be described a process when the stay event table updating unit 12 receives an arrival event, referring to FIG. 5. When the stay event table updating unit 12 receives an arrival event in step S1, it extracts the receiver ID (RID), the transmitter ID (TID), and information of time T in step S2, and converts the receiver ID (RID) into the place ID (PID), and the transmitter ID (TID) into the movable object ID (MID).

In next step S3, i indicating MIDi=MID is searched from the stay event table 13. When it is confirmed that i is found in step S4, the number Ni of stay events is increased by one whereby an entry of the stay event is added as follows.

PIDi-Ni←PID

ATi-Ni←T

STi-Ni←0

PIDi-Ni represents ID of a stay place (stay location) in the Ni-th stay event of the movable object (referred to as movable object MIDI) having the movable object ID (MIDi), ATi-Ni represents an arrival time, and STi-Ni represents a staying time.

When it is determined that i is not found in step S4, at first the total number n of movable objects is increased by one so as to be n←n+1 in step S6 to add an entry of movable object MIDn←MID. In this time, status flag STATn sets to STATn←STAY, namely "a stay". In step S7, the number of stay events of the movable object MIDn is initialized to Ni←1, and an entry of the stay event is added as follows.

PIDn-Nn←PID

ATn-Nn←T

STn-Nn←0

Figure 6:
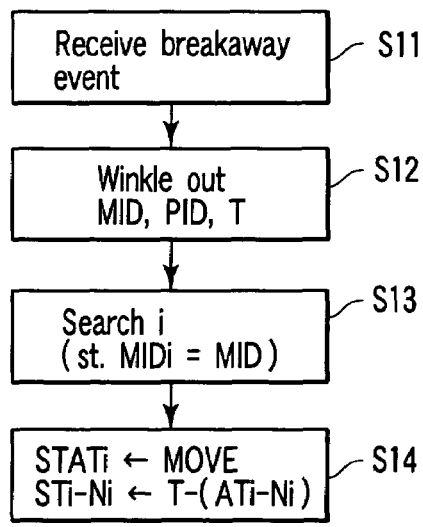
FIG. 6 is flowchart to explain an operation in a secession event receipt of a stay event table updating unit.

A process when the stay event table updating unit 12 receives a secession event will be described referring to FIG. 6.

When the stay event table updating unit 12 receives a secession event in step S11, the receiver ID (RID), the transmitter ID (TID) and information of time T are extracted in step S12, the receiver ID (RID) and the transmitter ID (TID) are converted into location ID and the movable object ID (MID), respectively. i representing MIDI=MID is searched in step S13, and status flag STATi and staying time STi-N i are changed in step S14 as follows.

STAT-i←MOVE

STi-Ni←T-(ATi-Ni)

The above-mentioned process maintains stay events corresponding to all movable object IDs (MID to MIDn) in the stay event table 13 in the latest status.

[Search Table 15]

The search table 15 connected to the search table updating unit 14 is, for example, a table of p lines×m columns as shown in FIG. 7, where m represents the number of locations ID defined by an observation area, and p represents the number of time zones to be divided. i lines×j columns elements CL i-j of the table configure a list {MIF(k, i, j)} comprising of stay information MIF(k, i, j)={MIDk, a (k, i, j), b(k, i, j)} for each time zone which concerns all movable objects MIDk having stay events {PIDk-a(k, i, j), Atk-a(k, i, j), STk-a(k, i, j)} to {PIDk-b(k, i, j), ATk-b(k, i, j), STk-b(k, i, j)} (1≦a(k, i, j)≦b(k, i, j)≦Nk) that stay in locations PIDj in time zone TSLi.

The time zone TSLi is defined by the following equation.

$$TSLi = [T(i-1), T(i)], i=i, \ldots, J, i=i, \ldots, p, T(i) > T(i-1)$$

where T(0) shows a start time of trail analysis, and T(p) shows a finish time of trail analysis.

[Search Table Updating Unit 14]

The search table updating unit 14 watches the stay event table 13, and performs a process for updating contents of the search table 15. Concretely, the movable object MIDk included in elements CL i-j={MIF (k, i, j)} of i lines×j columns of the search table 15 assumes all having the stay event {PID k-x, AT k-x, ST k-x} satisfying the following equation.

$$PIDk\text{-}x = PIDj$$

and $$ATk\text{-}x \leq T(i-1) \text{ and } ATk\text{-}x + STk\text{-}x > T(i-1)$$

or $$T(i-1) \leq ATk\text{-}x < T(i)$$

The minimum one of x satisfying the above condition is a(k, i, j), and the maximum one thereof is b(k, i, j).

Figure 8:
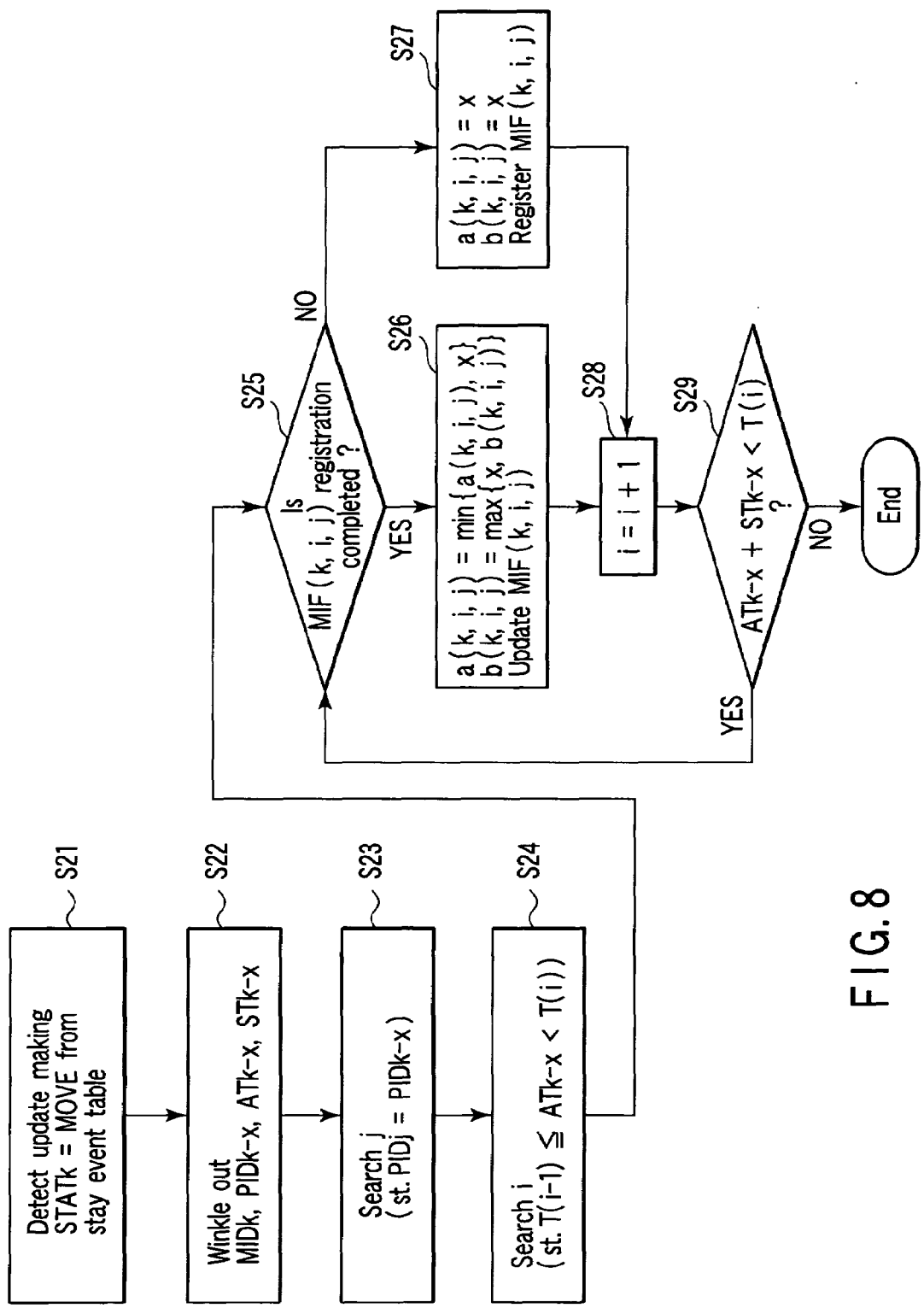
FIG. 8 is flowchart to explain an operation of a search table updating unit.

The processing routine of the search table updating unit 14 is described in conjunction with FIG. 8 hereinafter. When the update that STATk is changed to MOVE with the stay event table 13 in step S21, the update contents {MIDk, PIDk-x, ATk-x, STk-x} are extracted in step S22. In step S23, j indicating PIDj=PIDk-x is searched. i representing T(i−1)≦ATk-x<T(i) is searched in step S24.

In next step S25, it is determined whether MIF(k, i, j) is already registered in CLi-j. When it is determined that it is registered, the process advances to step S26, and when it is determined that it is not registered, the process advances to step S27. In step S26, a(k, i, j) and b(k, i, j) in registered MIF(k, i, j) are updated by the following equation to update MIF(k, i, j), and the process advances to step S28.

$$a(k, i, j) = \min\{a(k, i, j), x\}$$

$$b(k, i, j) = \max\{x, b(k, i, j)\}$$

On the other hand, in step S27, MIF(k, i, j)={MIDk, a(k, i, j), b(k, i, j)} is generated as (k, i, j)=b(k, i, j)=x, and registered in CL i-j. Thereafter, the process advances to step S28. In step S28, i=i+1 is calculated. In step S29, it is determined whether ATk-x+STk-x<T(i) is truth or not. When it is truth, the process returns to step S25. When it is false, the process finishes.

[Contact Extracting Condition Input Unit 16]

Figure 9:
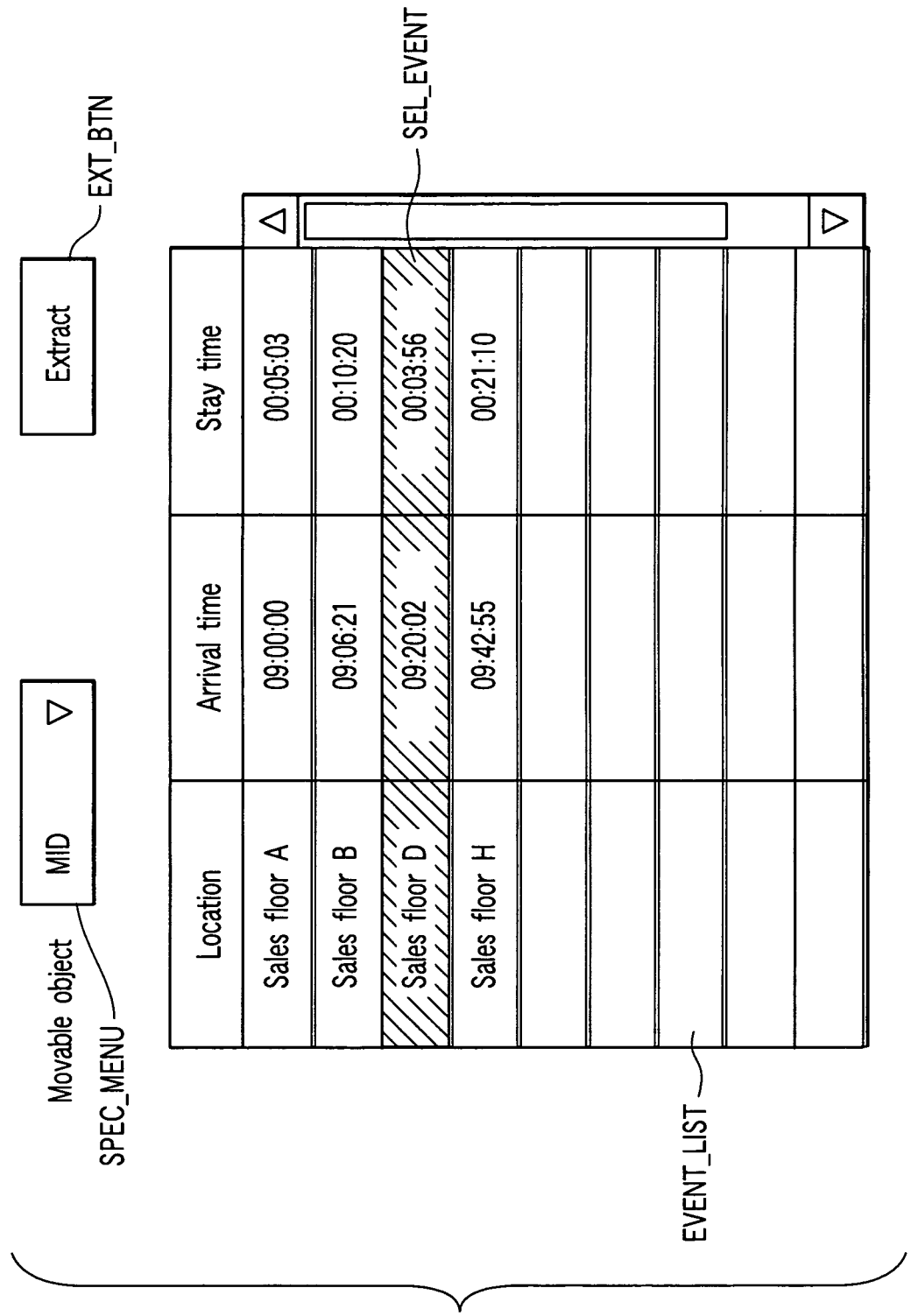
FIG. 9 is a diagram of an example of an interface screen used in a contact extract condition input unit.

The contact extracting condition input unit 16 is used by a user for inputting a contact condition by displaying an interface screen as shown in FIG. 9, for example, on the display unit 18. In other words, the contact extracting condition input unit 16 displays on the display unit 18 a reference movable object selection menu SPEC_MENU for selecting a movable object to be extracted, a stay event table EVENT_LIST displaying all stay events of the movable object selected by the reference movable object selection menu SPEC_MENU, and a search execution button EXT_BTN for indicating start of contact search.

When a user designates a movable object on the reference movable object selection menu SPEC_MENU in the interface of FIG. 9, contact between the movable objects is detected. In other words, the reference movable object selection menu SPEC_MENU extracts the lists MID1-MIDn of the movable object ID from the stay event table 13 to make items therefore. With the status that the movable object MIDk is selected in the reference movable object selection menu SPEC_MENU, the stay events {PIDk-1, ATk-1, STk-1} to {PIDk-Nk, ATk-Nk, STk-Nk} of the movable object MIDk stored in the stay event table 13 are displayed one event per one line on the stay event table EVENT_LIST. On the other hand, when the search execution button EXT_BTN is selected, a contact find process is instructed to the contact finder 19.

A system which selects only the movable object MIDk without designating the stay event SEL_EVENT or a system which does not also designate the movable object MIDk is considered as another example of the contact extracting condition input unit 16. In the case of the former, it is instructed to search for all movable objects came in contact with the movable object MIDk irrespective of location and time. In the case of the latter, it is instructed to search for all combinations of the movable objects which contact with each other. Various systems such as a system to indicate only a time zone in which the movable objects contact with each other, or a system to indicate only the location on which they contact with each other are conceivable.

[Contact Find Data Output Unit 17]

Figure 10:
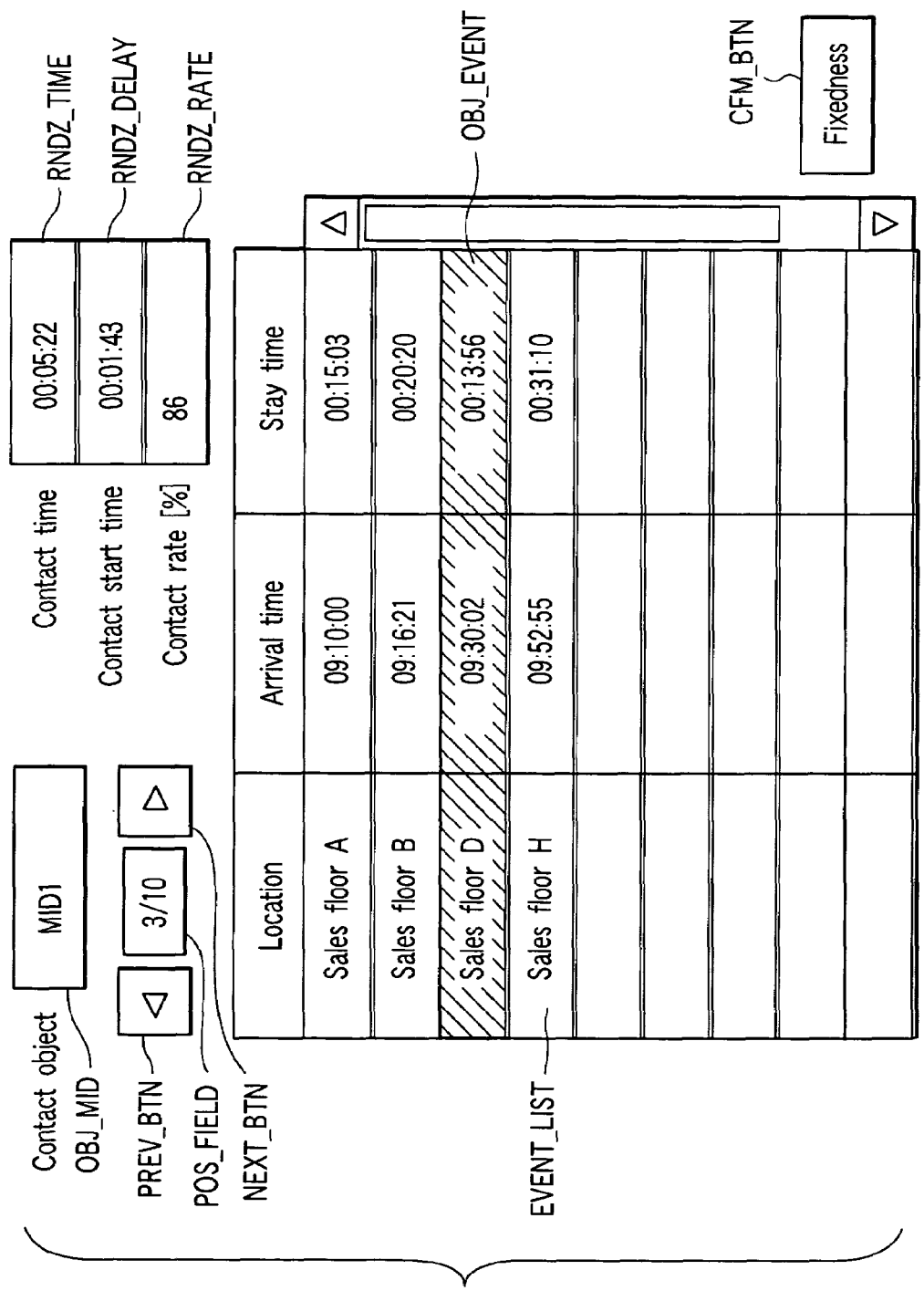
FIG. 10 is a diagram of an example of an interface screen used in a contact discovery data output unit.

The contact find data output unit 17 is used by the user for outputting contact find data by displaying an interface screen as shown in FIG. 10, for example, on the display unit 18. In other words, the contact find data output unit 17 displays on the display unit 18 a contact object display field OBJ_MID for displaying a movable object ID of a current contact object candidate, a previous candidate button PREV_BTN for displaying a previous contact object candidate, a candidate position field POS_FIELD for indicating positions of all of currently displayed contact object candidates, a next candidate button NEXT_BTN for displaying a next contact object candidate, a contact time field RNDZ_TIME for displaying an estimation contact time, a contact start time field RNDZ_DELA for displaying an estimated time required for contact, a contact rate field RNDZ_RATE for displaying a contact rate, a stay event table EVENT_LIST for displaying a stay event stream of currently selected contact object candidates, and a decision button CFM_BTN.

When the contact object candidate list CANDLIST is provided by the contact finder 19 described later, the contents of the first contact object candidate in the CANDLIST are displayed as an initial state, and the stay event table EVENT_LIST is automatically scrolled as necessary so that the line (or lines) indicating the stay event corresponding to a contact object is displayed, to select the line. The operation of the previous candidate button PREV_BTN and next candidate button NEXT_BTN allows change of the contact object candidate to be displayed. When the decision button CFM_BTN is selected in the situation that a certain stay event is displayed with selection status, an output display is finished with a state that the contact object is assumed to be decided. The decision button CFM_BTN is not needed necessarily. In this case, a stay event of highest possibility may be selected automatically.

[Momentary Contact Determining Unit 20]

FIRST EXAMPLE

Figure 11:
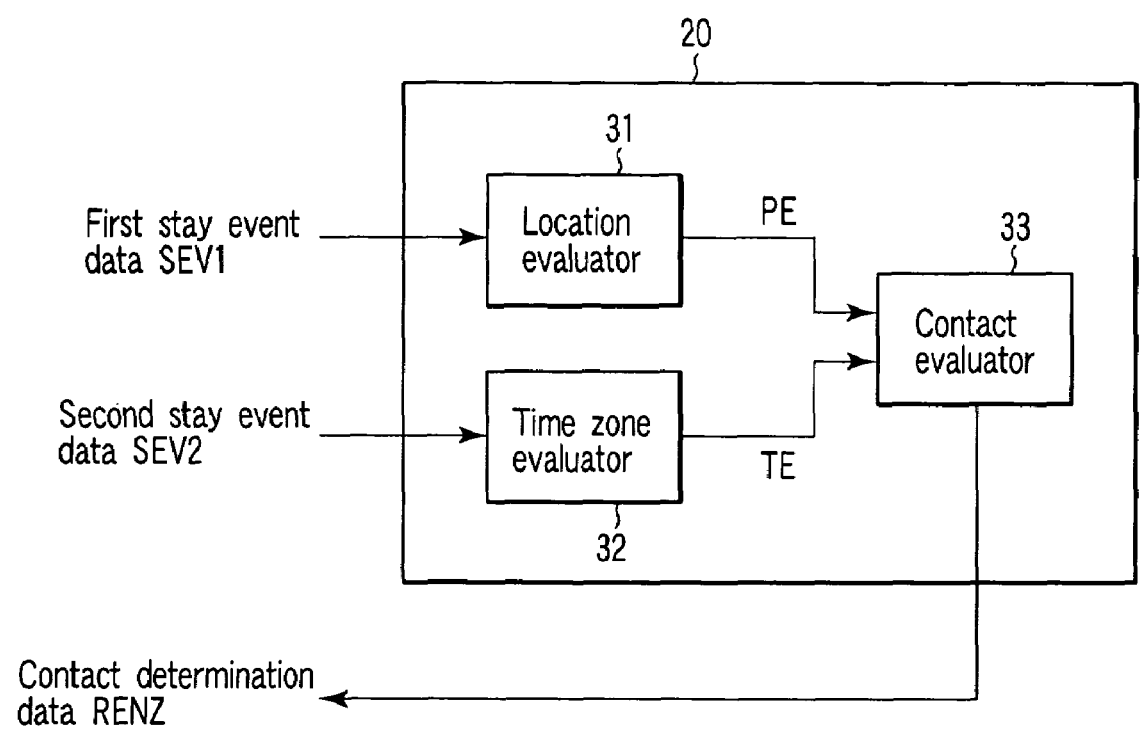
FIG. 11 is a block diagram of a momentary contact determination unit.

The momentary contact determining unit 20 comprises a location evaluator 31, a time zone evaluator 32 and a contact evaluator 33 as shown in FIG. 11, for example. The momentary contact determining unit 20 receives as an input first stay event data SEV1 and second stay event data SEV2 from the stay event table 13 via the contact finder 19 and the continuous contact determining unit 21, and outputs momentary contact determination data RENZ indicating momentary contact representing that two movable objects, for example, a customer and a salespeople come in contact with each other at a location.

The first stay event data SEV1 is an i-th stay event {PIDk-i, ATk-i, STk-i} of a certain movable object MIDk. The second stay event data SEV2 is a j-th stay event {PIDm-j, ATm-j, STm-j} of another movable object MIDm. The first stay event data SEV1 and second stay event data SEV2 are input to the location evaluator 31 and time zone evaluator 32.

The location evaluator 31 compares location data PIDk-i and PID m-j of the first stay event data SEV1 and second stay event data SEV2 to output a comparison result as location evaluation data PE. If PIDk-i=PIDm-j, PE=1 is assumed. In another case, PE=0 is assumed. In other words, the location evaluator 31 evaluates, based on the first stay event data SEV1 and the second stay event data SEV2, whether or not the first location where the first movable object MIDk exists and the second location where the second movable object MIDm exists coincide with each other.

The time zone evaluator 32 evaluates, based on the first stay event data SEV1 and the second stay event data SEV2, whether or not the first time zone $ATm-j+STm-j$ specified by the arrival time and staying time of the first movable object MIDk with respect to the first location overlaps with the second time zone $ATk-i+STk-i$ specified by the arrival time and staying time of the second movable object MIDm with respect to the second location. In other words, the time zone evaluator 32 compares data ATk-i, STk-i and ATm-j, STm-j relating to the times of the first stay event data SEV1 and second stay event data SEV2 to output a result of comparison as time zone estimation data TE. The time zone estimation data TE is calculated by, for example, the following equation.

$$TE=\max\{\min(ATm-j+STm-j, ATk-i+STk-i)-\max(ATk-i, ATm-j),0\}/STk-I \quad (1)$$

The equation (1) represents multiplicity of a time zone of the second stay event with respect to the first stay event, and indicates a value between 0 and 1. In other words, the multiplicity indicated by the equation (1) is a ratio of a length of the first time zone to a length of the third time zone (contact time t) in which the first time zone $ATm-j+STm-j$ and the second time zone $ATk-i+STk-i$ overlap.

The contact evaluator 33 receives location evaluation data PE and time zone evaluation data TE, and calculates and outputs contact determination data RENZ. The contact determination data RENZ is calculated by, for example, the following equation.

$$RENZ=PE \times TE \quad (2)$$

In other words, the contact determination data RENZ outputs the multiplicity which is time zone evaluation data TE, and takes a value aside from 0, only when the location of the second stay event data SEV1 coincides with that of the second stay event data SEV2, and time zones thereof overlap. When the contact determination data RENZ corresponding to an output of the contact determining unit 33 is positive, "contact" is determined, and when it is 0, "non contact" is determined. The contact determination data RENZ output from the momentary contact determining unit 20 is input to the continuous contact determination unit 21.

[Continuous Contact Determining Unit 21]

The continuous contact determining unit 21 receives a first stay event data stream SEVS1 and a second stay event data stream SEVS2 from the stay event table 13 via the contact finder 19, and outputs continuous contact determination data TRENZ indicating whether two movable objects, for example, a customer and a salespeople comes in contact with each other continuously over a plurality of locations. In other words, the continuous contact corresponds to a sequence of momentary contacts.

The first stay event data line SEVS1 is a stay event data substring {PIDk-ak, ATk-ak, STk-ak}, . . . , {PIDk-bk, ATk-bk, STk-bk} (where, $1 \leq ak \leq bk \leq Nk$) of a certain movable object MIDk. The second stay event data stream SEVS2 is a stay event data stream {PIDm-am, ATm-am, STm-am}, . . . , {PIDm-bm, ATm-bm, STm-bm} (where, $a \leq am \leq bm \leq Nm$) of another movable object MIDm.

The continuous contact determining unit 21 determines whether the movable object MIDk comes in contact with the movable object MIDm continuously. If it determines "contact", it outputs, for example, TRENZ=1. If it determines "non-contact", it outputs, for example, TRENZ=0. The continuous contact determination data TRENZ output from the continuous contact determining unit 21 is input to the contact finder 19.

Figure 12:
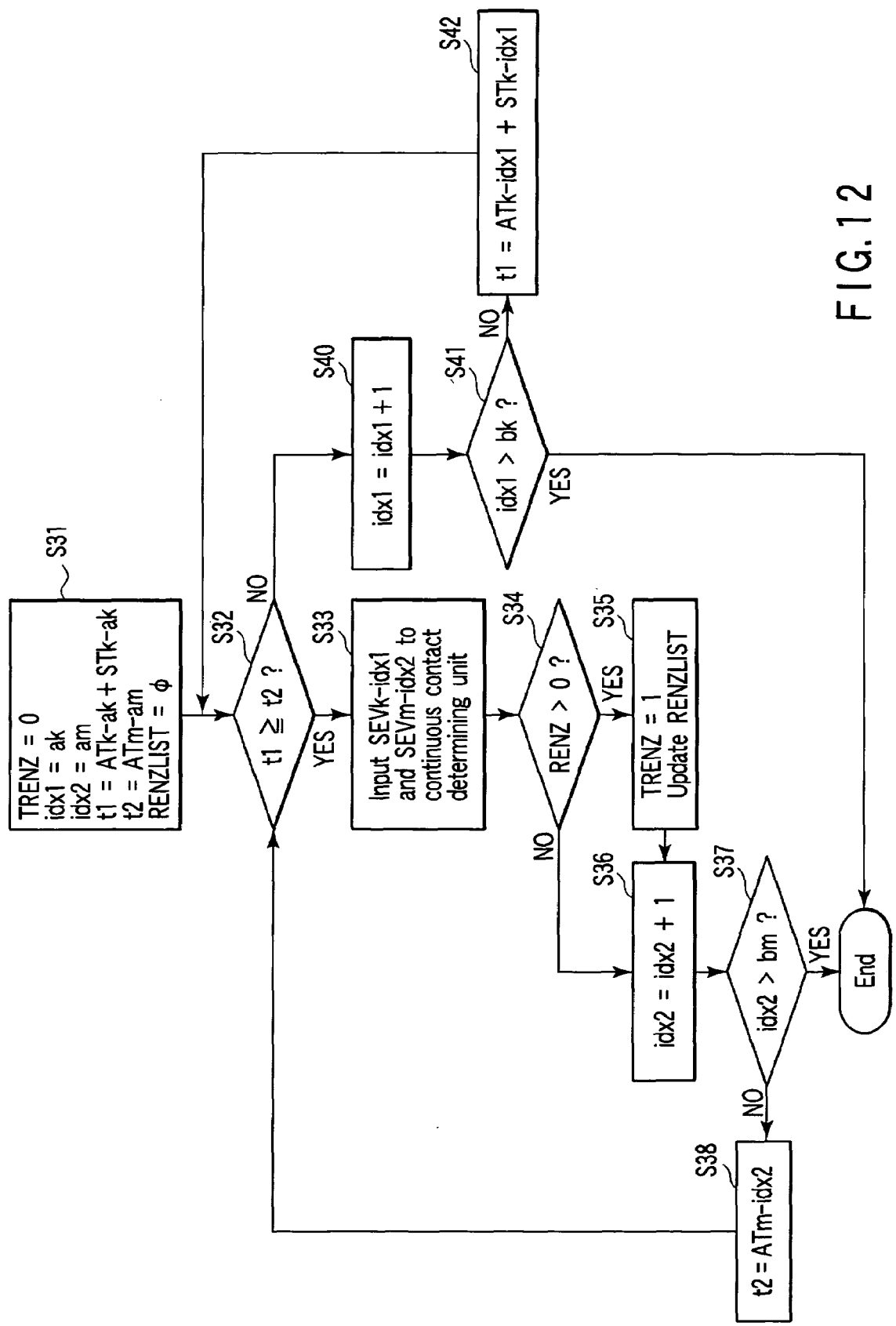
FIG. 12 is flowchart to explain an operation of a continuous contact determination unit.

A computation procedure for the continuous contact determination data TRENZ is described in conjunction with FIG. 12 hereinafter. The continuous contact determining unit 21 determines a continuous contact when a plurality of momentary contact estimation results from the momentary contact determining unit 20 indicate the momentary contact more than a given rate. After the first continuous contact determining unit 21 initializes the variables used in step S31 as described below, the process advances to step S32.

TRENZ=0;

IDx1=ak;

IDx2=am;

$t1=ATk-ak+STk-ak$;

$t2=ATm-am$;

RENZLIST=φ

It is determined whether $t1 \geq t2$ in step S32. If the determination is YES, the process advances to step S33, and if it is NO, the process advances to step S40. In step S33, stay event data SEVk-IDx1={PIDk-IDx1, ATk-Dx1, STk-IDx1} and SEVm-IDx2={PIDm-IDx2, Atm-IDx2, STm-IDx2} are input to the momentary contact determining unit 20 as the first stay event data SEV1 and the second stay event data SEV2 respectively, to get contact determination data RENZ as an output. Then, the process advances to step S34. In step S34, it is determined whether or not RENZ is positive. When RENZ is determined to be positive, the process advances to step S35, and if it is not positive, that is, RENZ=0, the process advances to step S36.

In step S35, in order to indicate contact between the movable object MIDm and the movable object MIDk, the continuous contact determination data TRENZ is set to TRENZ=1. Simultaneously, contact status information RENZINFO={SEVk-IDx1, SEVm-IDx2, RENZ} is additionally registered in the contact status information list RENZLIST recording occurrence of contact, and the process advances to step S36. In step S36, the following equation (3) is calculated for changing a to-be searched stay event of the movable object MIDm, and the process advances to step S37.

$$IDx2 = IDx2 + 1 \quad (3)$$

In step S37, it is determined whether IDx2 exceeds bm. When the determination is YES, the process advances to step S38, and when it is NO, the process advances to step S39. A series of processes finishes in step S38. In step S39, the following equation is calculated, and the process returns to step S32.

$$t2 = ATm - IDx2 \quad (4)$$

In step S40, the following equation is calculated to change a to-be-researched stay event of movable object MIDk, and then the process advances to step S41.

$$IDx1 = IDx1 + 1 \quad (5)$$

In step S41, it is determined whether IDx1 does not exceed bk. If the determination is NO, the process advances to step S42, and if it is YES, the process finishes. In step S42, the following equation is calculated, and then the process returns to step S32.

$$t1 = ATk - IDx1 + STk - IDx1 \quad (6)$$

If continuous contact determination data TRENZ is 1 by the above-mentioned process, it is determined that the movable object MIDk and the movable object MIDm contact with each other. Information representing when and where the movable objects had contacted is stored in the list RENZLIST.

[Contact Finder 19]

Figure 13:
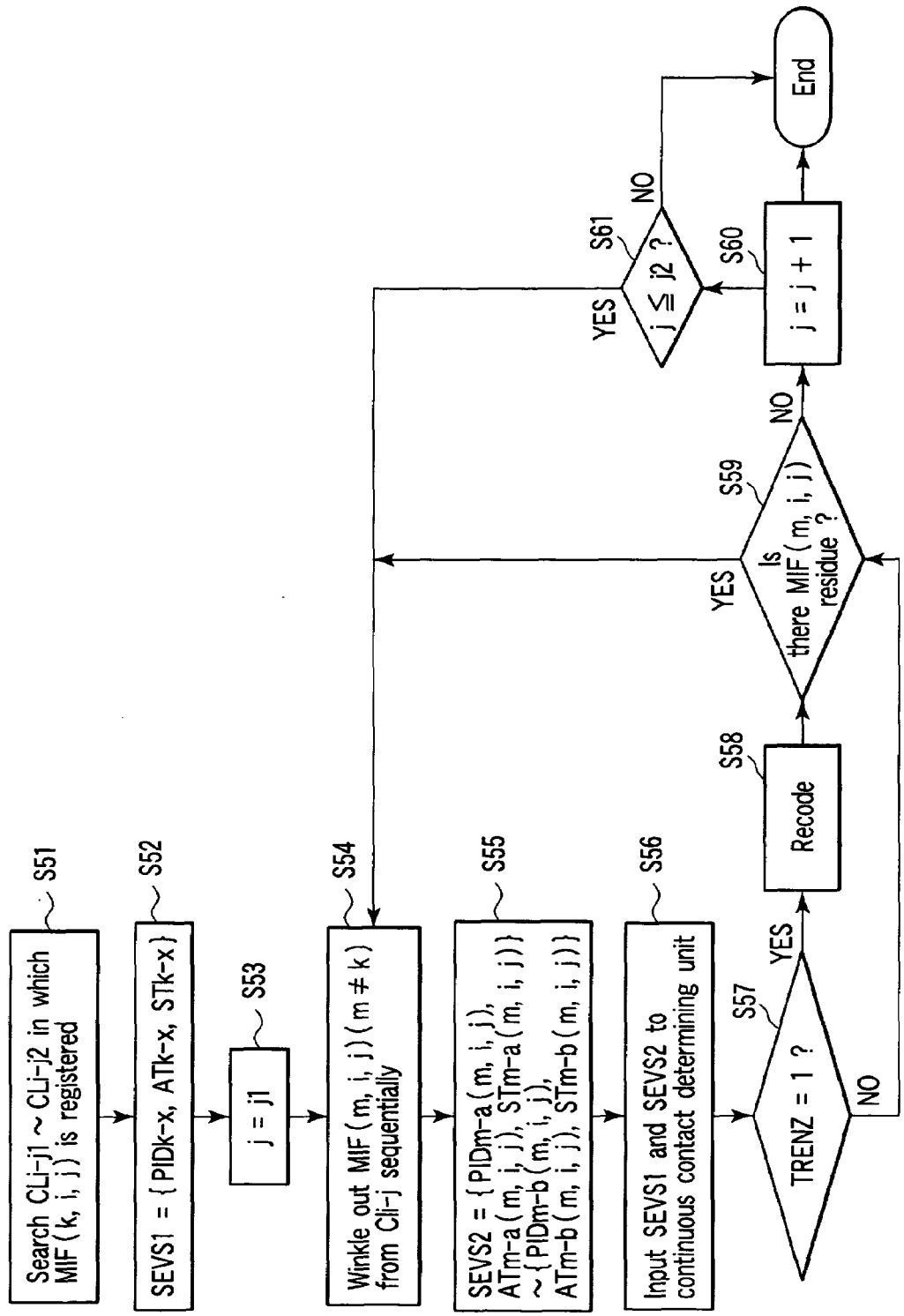
FIG. 13 is flowchart to explain an operation of contact discovery unit.

The contact finder 19 extracts, from among the movable objects which are cyclopedically sequentially selected from a plurality of movable objects based on the condition set by the contact extracting condition input unit 16, two movable objects determined to be continuous contact by the continuous contact determining unit 21, and outputs contact find data. The process of the contact finder 19 will be described in conjunction with FIG. 13 with regard to a case that the set condition is a condition "searching for contact with another movable object in a specific location and a specific time zone (a specific stay event {PIDk-x, ATk-x, STk-x}) of a specific movable object MIDk".

At first in step S51, the contact finder 19 searches elements CLi–j1-PCLi-j2 (j1≦j2) which stay-by-time-zone information MIF(k, i, j) of the movable object MIDk is registered in the search table 15. In step S52, the first stay event data stream SEVS1 is set to the following equation.

$$SEVS1 = \{PIDk\text{-}x, ATk\text{-}x, STk\text{-}x\} \quad (7)$$

After j is initialized to j=j1 in next step S53, one stay-by-time-zone information MIF(m, i, j) (m≠k) is extracted from CLi-j searched in step S54. In step S55, the second stay event data stream SEVS2 is set by the following equation.

$$SEVS2 = \{PIDm\text{-}a(m, i, j), ATm\text{-}a(m, i, j), STm\text{-}a(m, i, j)\} \text{ to } \{PIDm\text{-}b(m, i, j), ATm\text{-}b(m, i, j), STm\text{-}b(m, i, j)\} \quad (8)$$

In step S56, the first stay event data stream SEVS1 and the second stay event data stream SEVS2 are input to the continuous contact determining unit 21 to obtain continuous contact determination data TRENZ and contact status information list RENZLIST. In step S57, it is determined whether TRENZ=1, that is, whether continuous contact exists. When it is determined that there is continuous contact, the process advances to step S58. When it is determined in step S57 that there is no continuous contact, the process advances to step S59.

In step S58, a contact status information list RENZLIST (RENZLIST assumes a list as an element) is added to a contact object candidate list CANDLIST, and then the process advances to step S59.

It is examined in step S59 whether unprocessed stay-by-time-zone information MIF (m, i, j) (m≠k) remains. If it remains, the process returns to step S54. If it does not remain, the process advances to step S60.

In step 60, j=j+1 is calculated, and then the process advances to step S61. It is determined in step S61 whether j≦j2. If the determination is YES, the process returns to step S54. If it is NO, the process finishes in step S62.

By the above process, the stay event that might come in contact with the specific stay event {PIDk-x, ATk-x, STk-x} of the movable object MIDk is recorded in the contact object candidate list CANDLIST. The contents of the contact object candidate list CANDLIST is sorted in order of decreasing total value (may be maximum) of the contact determination data RENZ of the contact status information list RENZLIST corresponding to each element.

In the embodiment, a contact candidate for a specific stay event of a specific movable object is searched for as a contact extract condition, but the condition that specifies or not specify each of a movable object, a contact time zone and a contact location in similar configuration can be set. In other words, the contact finder 19 may extract two movable objects determined to have the continuous contact about at least one of a plurality of specific movable objects, a specific location and a specific time zone.

Further, contact between companions can be extracted, too. In this case, it is preferable to set a condition to search for a movable object very likely to be contact over the whole of time zone.

[Momentary Contact Determination Unit 20]

SECOND EXAMPLE

Second example of the momentary contact determination unit 20 will be described referring to FIG. 14. The momentary contact determination unit 20 of FIG. 14 comprises an action estimation table 34 and a contact contents estimator 35 as well as the location evaluator 31, the time zone evaluator 32 and the contact evaluator 23 shown in FIG. 11.

Figures 14, 15:
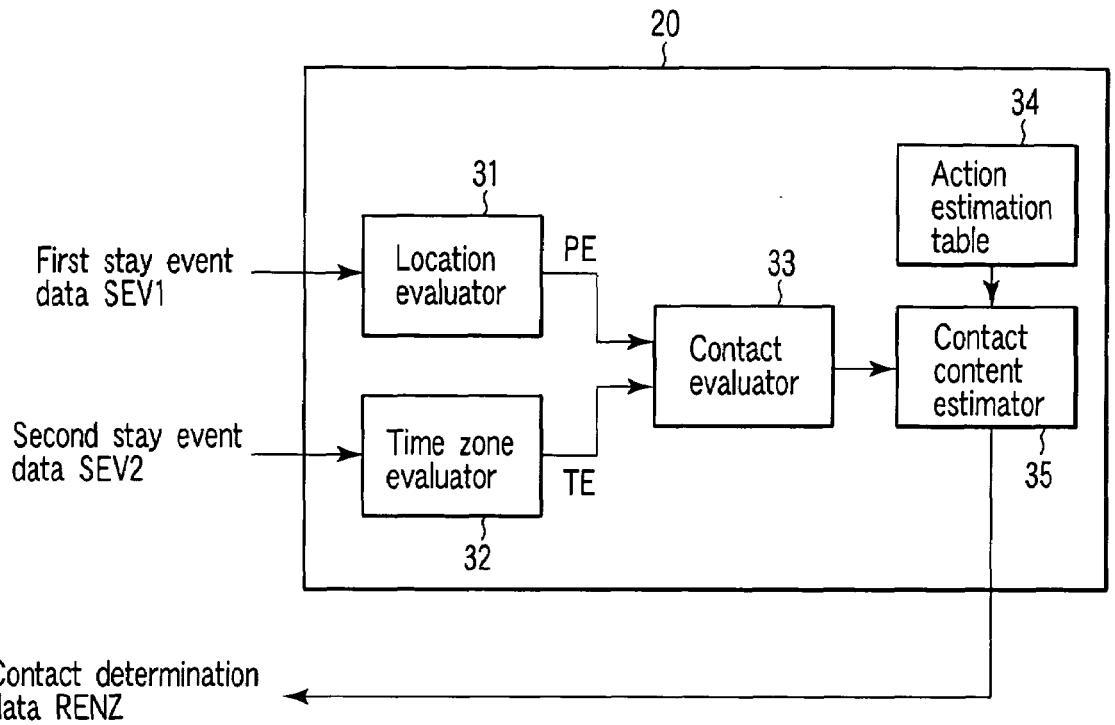
FIG. 14 is a block diagram of another example of the momentary contact determination unit.
FIG. 15 is a diagram showing an example of a structure according to an action operator estimation table.

The action estimation table 34 defines a time zone of tni-j to txi-j (tni-j≦txi-j) and estimation situation pdsi-j (1≦j) with regard to each location PIDi (1≦i≦m) as shown in FIG. 15, for example. For example, a value representing a time zone of tn1-1=5 to tx1-1=30 and estimation situation pds-1="attendance-on-customer" of the location PID1 is defined.

On, for example, a location PID2, a value representing estimation situation pds-1="passage" and a time zone of tn2-1=0 to tx2-1=1 minutes is defined, a value representing estimation situation pds-2="goods confirmation" and a time zone of tn2-2=1 to tx2-2=3 minutes is defined, a value representing estimation situation pds-3="goods contact" and a time zone of tn2-3=3 to tx2-3=10 minutes is defined, and a value representing a time zone of tn2-4=10 to tx2-4=13 minutes and estimation situation pds-4="attendance-on-customer" value is defined.

When the contact contents estimator 35 receives the contact determination data RENZ from the contact evaluator 20, it is examined whether the location PID at which contact occurs is registered in the action estimation table 34. When the location PID where contact occurs is registered in the action estimation table 34, the contact contents estimator 35 examines whether the contact time t (length of the third time zone) is within a given time length. When the contact time t is in the given time length, a given estimation situation is determined.

For example, when the location where contact occurs is PID1 and the contact time t satisfies $tn1\text{-}1 \leq t \leq tx1\text{-}1$ (a time of tx1-1 to tn1-1 is a given time length), it is estimated that contents of the contact indicate a status of "attendance-on-customer". This estimation situation is added as a part of contact determination data RENZ thereto and output from the contact contents estimator 35. In this way, in the example of FIG. 14, contents of an event to occur in an observation area becomes more plain because the concrete estimation situation is added to contact determination data RENZ as an output of momentary contact determination unit 20.

[Momentary Contact Determination Unit 20]

THIRD EXAMPLE

Figure 16:
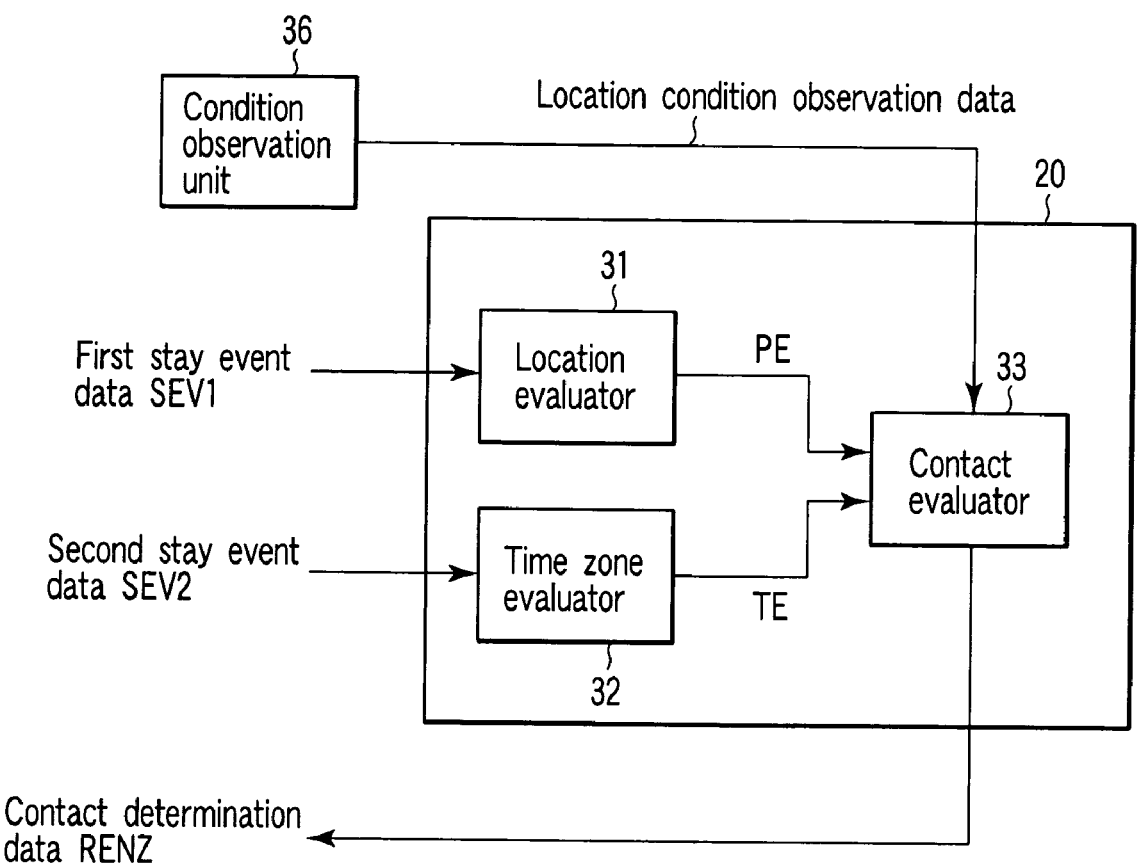
FIG. 16 is a block diagram of another example of the momentary contact determination unit.

The third example of the momentary contact determination unit 20 is shown in FIG. 16. The momentary contact determination unit 20 of FIG. 16 comprises a location evaluator 31, a time zone evaluator 32 and a contact evaluator 33 similarly to FIG. 11, but differs from FIG. 11 in that data is supplied from the status observation unit 36 to the contact evaluator 33. The status observation unit 36 is a device installed together with the sensor system 11 of FIG. 1 to observe status in each location. This comprises, for example, a video camera such as a CCD camera installed in each location. A location status observational data OB (for example, image data of the CCD camera) from the status observation unit 36 installed on each location is input to the contact evaluator 33.

The momentary contact evaluator 20 evaluates whether contact occurs or what contents of the contact by referring to location status observational data OB as well as location evaluation data PE from the location evaluator 31 and time zone evaluation data TE from the time zone evaluator 32, to output contact determination data RENZ. In this way by using information from a system other than the sensor system 11 together, more exact evaluation is available. As another modification of the status observation unit 36, a collecting sonic reflection microphone or a piezoelectric sensor may be used.

[Contact Dependent Process Starter 22]

When the contact finder 19 finds a specific contact status, the contact dependant process starter 22 starts automatically a process (contact dependant process) previously determined referring to the contact dependant process definitions table 23. The contact dependant process definitions table 23 is a table storing one or more contact dependant processing sets of a specific contact condition and a process corresponding thereto.

When the contact finder 19 outputs contact find data, the contact dependant process starter 22 examines whether contents of the contact find data matches with contact condition included in the contact dependant processing set stored in the contact dependant process definitions table 23. When it matches with the contact condition, the contact dependant process starter 22 outputs a designation signal 24 starting a corresponding process.

Various concrete examples of the contact dependant process starter 22 are conceivable. For example, when contact between the movable objects is found, it is conceivable to start an operation to turn a monitor camera to the location where the movable objects exist, a capture operation of the monitor camera, or a call of the portable telephone which an specific person possesses.

SECOND EMBODIMENT

Figure 17:
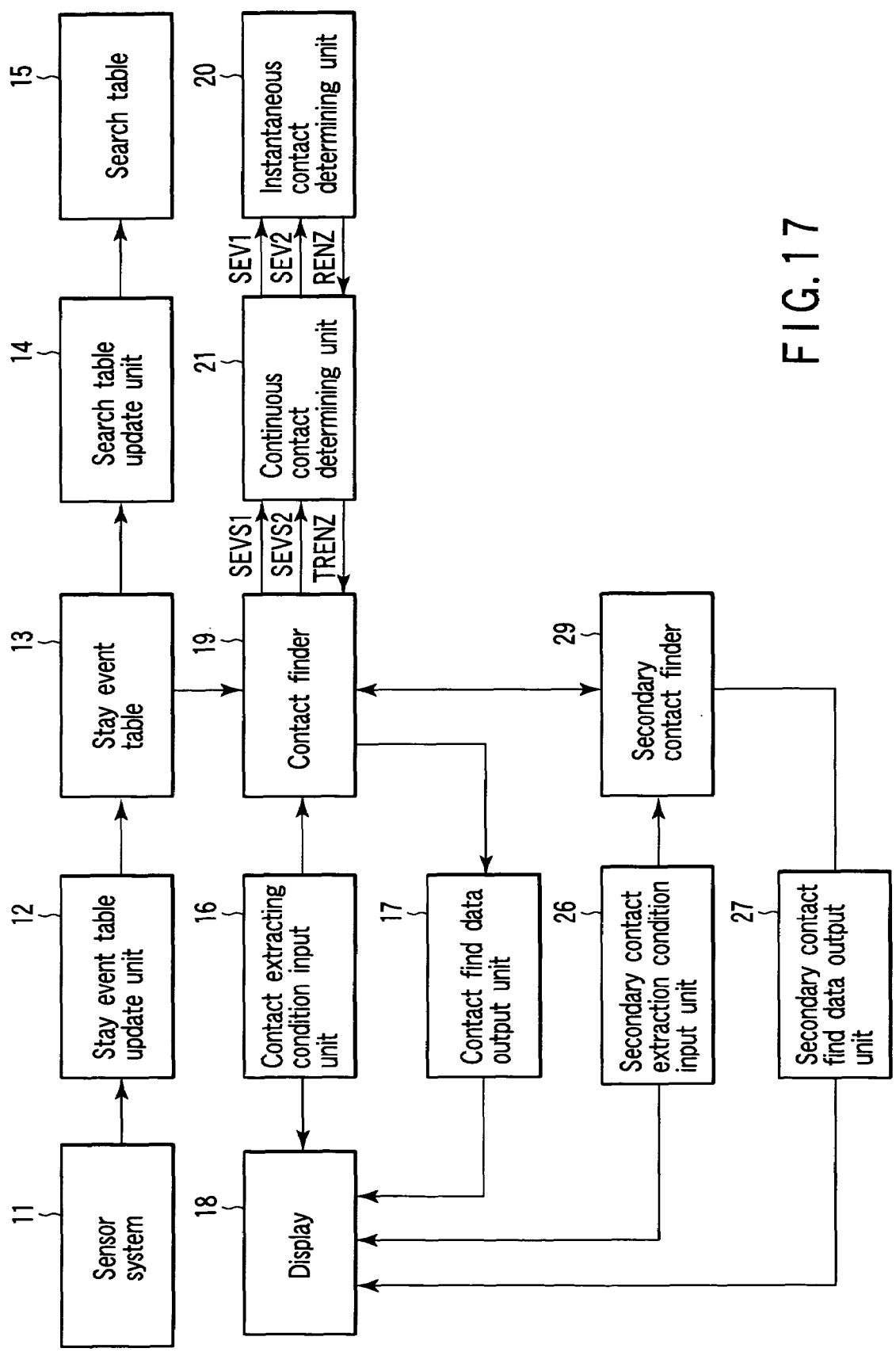
FIG. 17 is a block diagram of a trail analysis system according to the second embodiment of the present invention.

The second embodiment of the present invention will be described referring to FIG. 17. The trail analysis system of the present embodiment comprises a secondary contact extracting condition input unit 26, a secondary contact find data output unit 27 and a secondary contact finder 29 added to the first embodiment shown in FIG. 1.

The secondary contact extraction condition input unit 26 sets a secondary contact extraction condition input by a user via an interface (not shown), for example, at least one of a specific movable object and a specific location, and a time.

The second contact finder 29 does a process for finding secondary contact between the movable objects from the contact find data output from the contact finder 19 based on the secondary contact extraction condition input and set by the secondary contact extraction condition input unit 26. The secondary contact extraction condition assumes a movable object PIDp and a time ST. In this case, all the contacts matching the following conditions are searched for.

All movable objects which came directly in contact with the movable object PIDp after the time ST are referred to as primary contact movable objects. The time at which the primary movable objects came in contact with the movable object PIDp is referred to as a primary contact time. All movable objects came in contact with the primary movable objects after respective primary contact times as well as the primary movable objects are searched for. Similarly, all movable objects (referred to as secondary contact movable objects) which came indirectly in contact with the movable objects PIDP are searched for.

The movable object PIDP is one of the first movable object PIDk and the second movable object PIDm, and the primary contact movable object is the other of the first movable object PIDk and the second movable object PIDm. In other words, If, for example, the movable object PIDp is the first movable object PIDk, the primary contact movable object which came directly in contact with this is the second movable object PIDm. The secondary contact movable object which came indirectly in contact with the movable object PIDP is a movable object came in contact with the second movable object PIDm which is the primary contact movable object.

The second contact find data output unit 27 does a process for displaying all the second contact movable objects searched for by the second contact finder 29 on the display unit 18. Various methods of displaying the second contact movable object are conceivable, but it is effective to display the searched second contact movable object on a map. The second contact extraction condition input unit 26 may be configured to be able to designate condition "until what dimensional contact" and/or "till when" as an object to be extracted.

According to the second embodiment, since the secondary contact of the movable objects can be found, the embodiment is available for searching for a person came in contact with an epidemic patient such as SARS when the movable objects to be subjected to a trail analysis assume people in a hospital, namely patients, staffs (doctors, nurses) and visit persons.

According to the present invention, the contact between the movable objects can be effectively detected not using visual inspection but using the coidentity of the locations where the movable objects exist and the overlap of the time zones thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A trail analysis method of movable object comprising:
   acquiring, via wireless communications, first stay event data indicating a first location where a first movable object exists, a first arrival time of the first movable object to the first location and a first staying time thereof, and second stay event data indicating a second location where a second movable object exists, a second arrival time of the second movable object to the second location and a second staying time thereof;
   acquiring location evaluation indicating whether the first location coincides with the second location based on the first stay event data and the second stay event data;
   acquiring time zone evaluation indicating whether a first time zone specified by the first arrival time and the first staying time and a second time zone specified by the second arrival time and the second staying time overlap, from the first stay event data and the second stay event data; and
   evaluating contact between the first movable object and the second movable object based on the location evaluation and the time zone evaluation to output evaluation data.

2. The trail analysis apparatus according to claim 1, wherein acquiring the time zone evaluation includes outputting overlap between the first time zone and the second time zone as an evaluation result, and evaluating the contact includes outputting zero as an evaluation result when non-contact between the first movable object and the second movable object is evaluated based on the location evaluation and the overlap, and outputting the overlap as an evaluation result when contact between the first movable object and the second movable object is evaluated.

3. The method according to claim 1, further comprising estimating contents of contact between the first movable object and the second movable object from a length of a third time zone which the first time zone and the second time zone overlap with each other.

4. The method according to claim 1, which further comprises observing a status in the first location or the second location to obtain an observation result, and wherein evaluating the contact includes evaluating contact between the first movable object and the second movable object based on the location evaluation, the time zone evaluation and the observation result.

5. A trail analysis method of a movable object comprising:
   acquiring, via wireless communications, a stream of plural first stay event data indicating first locations where a first movable object exists, a first arrival time of a first movable object to the first location and a first staying time of the first movable object, and a stream of plural second stay event data indicating second locations where a second movable object exists, a second arrival time of the second movable object to each of the second locations and a second staying time of the second movable object;
   acquiring location evaluation indicating whether the first locations coincides with the second locations, from the first stay event data and the second stay event data;
   acquiring time zone evaluation indicating whether a first time zone specified by the first arrival time and the first staying time and a second time zone specified by the second arrival time and the second staying time overlap, from the first stay event data and the second stay event data;
   evaluating momentary contact between the first movable object and the second movable object based on the location evaluation and the time zone evaluation to output a plurality of momentary contact evaluation results in correspondence with the first stay event data and the second stay event data; and
   deriving continuous contact between the first movable object and the second movable object from the plurality of momentary contact evaluation results to output continuous contact data.

6. A trail analysis apparatus for a movable object comprising:
   a sensor unit configured to acquire first stay event data indicating a first location where a first movable object exists, a first arrival time of the first movable object to the first location and a first staying time, and second stay event data indicating a second location where a second movable object exists, a second arrival time of the second movable object to the second location and a second staying time;
   a location evaluator to evaluate whether the first location coincides with the second location based on the first stay event data and the second stay event data;
   a time zone evaluator to evaluate whether a first time zone specified by the first arrival time and the first staying time and a second time zone specified by the second arrival time and the second staying time overlap, from the first stay event data and the second stay event data; and
   a contact evaluator to evaluate contact between the first movable object and the second movable object using evaluation results of the location evaluator and the time zone evaluator.

7. The trail analysis apparatus according to claim 6, wherein the time zone evaluator is adapted to output overlap between the first time zone and the second time zone as an evaluation result, and the contact evaluator is adapted to output zero as an evaluation result when it evaluates non-contact between the first movable object and the second movable object based on the evaluation result of the location evaluator and the overlap, and to output the overlap as an evaluation result when it evaluates contact between the first movable object and the second movable object.

8. The trail analysis system according to claim 7, wherein the overlap is a ratio of a length of a third time zone that the first time zone overlaps with the second time zone to a length of the first time zone.

9. The trail analysis system according to claim 6, further comprising a contact contents estimation unit configured to estimate contents of contact between the first movable object and the second movable object from a length of a third time zone which the first time zone and the second time zone overlap with each other.

10. The trail analysis system according to claim 9, further which comprises a table storing the length of the third time zone and the contents of contact in association with each other and wherein the contact contents estimator estimates the contact contents referring to the table.

11. The trail analysis system according to claim 6, which further comprises a status observation unit configured to observe a status in the first location or the second location, and wherein the contact evaluator is adapted to evaluate contact between the first movable object and the second movable object based on evaluation results of the location evaluator and the time zone evaluator and an observation result of the status observation unit.

12. A trail analysis apparatus for a movable object comprising:
   a sensor unit configured to acquire a stream of first stay event data indicating a first location where a first movable object exists, a first arrival time of the first movable object to the first location and a first staying time, and a stream of second stay event data indicating a second location where a second movable object exists, a second arrival time of the second movable object to the second location and a second staying time;
   a location evaluator to evaluate whether the first location coincides with the second location based on the first stay event data and the second stay event data;
   a time zone evaluator to evaluate whether a first time zone specified by the first arrival time and the first staying time and a second time zone specified by the second arrival time and the second staying time overlap, from the first stay event data and the second stay event data; and
   a momentary contact evaluator to evaluate contact between the first movable object and the second movable object based on evaluation results of the location evaluator and the time zone evaluator, and output a plurality of momentary contact evaluation results in association with the first stay event data and the second stay event data; and
   a continuous contact detector to detect continuous contact between the first movable object and the second movable object based on the plurality of momentary contact evaluation results.

13. The trail analysis system according to claim 12, wherein the continuous contact detector is adapted to detect continuous contact when the plurality of momentary contact evaluation results indicate momentary contact in more than a given ratio.

14. The trail analysis system according to claim 12, further comprising a contact finder to extract the first movable object and the second movable object which are detected as ones having continuous contact by the continuous contact detector, from among the plurality of movable objects when two movable objects sequentially selected from the plurality of movable objects cyclopedically assume the first movable object and the second movable object, and output the first stay event data and the second stay event data corresponding to the first movable object and the second movable object as contact find data.

15. The trail analysis system according to claim 14, wherein the contact finder is adapted to extract the first movable object and the second movable object that are determined as continuous contact with regard to at least one of a group of a plurality of specific movable objects, a specific location and a specific time zone.

16. The trail analysis system according to claim 14, which further comprises a table having individual movable object lists every time zone or every location or every time zone and location, and
   wherein the contact detector is adapted to extract the first movable object and the second movable object that are determined as continuous contact, from the plurality of movable objects in a movable list which satisfy the designated condition referring to the table, when at least one of a specific time zone and a specific location is designated as a condition for extracting the first movable object and the second movable object which are determined as continuous contact.

17. The trail analysis system according to claim 14, further comprising:
   a contact dependant process definitions table to store one or more contact dependant process sets having a set of a specific contact condition and a process corresponding thereto; and
   a contact dependent process starting unit configured to start the process when contents of the contact find data matches with a contact condition included in the contact dependant processing set stored in the contact dependant process definitions table.

18. The trail analysis system according to claim 14, further comprising a secondary contact detection unit configured to obtain a primary contact movable object came in direct contact with a specific movable object and a primary contact time thereof by using as an extraction condition the specific movable object and time of the contact find data, and extract a secondary movable object came in contact with the primary contact movable object on and after the primary contact time.

19. A program stored in a computer readable medium for analyzing a trail of a movable object, comprising:
   means for instructing a computer to acquire first stay event data indicating a first location where a first movable object exists, a first arrival time of the first movable object to the first location and a first staying time, and second stay event data indicating a second location where a second movable object exists, a second arrival time of the second movable object to the second location and a second staying time;
   means for instructing the computer to evaluate whether the first location coincides with the second location based on the first stay event data and the second stay event data;
   means for instructing the computer to evaluate whether a first time zone specified by the first arrival time and the first staying time and a second time zone specified by the second arrival time and the second staying time overlap, from the first stay event data and the second stay event data; and
   means for instructing the computer to evaluate contact between the first movable object and the second movable object using evaluation result of the evaluating of the location and the evaluating of the second staying time.

20. A program stored in a computer readable medium for analyzing a trail of a movable object, comprising:
- means for instructing a computer to acquire a stream of first stay event data indicating a first location where a first movable object exists, a first arrival time of a first movable object to the first location and a first staying time of the first movable object, and a stream of second stay event data indicating a second location where a second movable object exists, a second arrival time of the second movable object to the second location and a second staying time of the second movable object;
- means for instructing the computer to evaluate whether the first location coincides with the second location, from the first stay event data and the second stay event data;
- means for instructing the computer to evaluate whether a first time zone specified by the first arrival time and the first staying time and a second time zone specified by the second arrival time and the second staying time overlap, from the first stay event data and the second stay event data;
- means for instructing the computer to evaluate momentary contact between the first movable object and the second movable object based on evaluation results of the evaluating of the location and the evaluating of the time zone to output a plurality of momentary contact evaluation results in correspondence with the first stay event data and the second stay event data; and
- means for instructing the computer to derive continuous contact between the first movable object and the second movable object based on the plurality of momentary contact evaluation results.

* * * * *